Patented Dec. 19, 1922.

1,439,514

UNITED STATES PATENT OFFICE.

GEORGES HEBERLEIN, OF WATTWIL, SWITZERLAND, ASSIGNOR TO HEBERLEIN PATENT CORPORATION, OF NEW YORK, N. Y., A CORPORATION OF NEW YORK.

PROCESS FOR PRODUCTION OF PERMANENT EFFECTS IN COTTON FABRICS.

No Drawing. Application filed September 1, 1921. Serial No. 497,739.

(GRANTED UNDER THE PROVISIONS OF THE ACT OF MARCH 3, 1921, 41 STAT. L., 1313.)

*To all whom it may concern:*

Be it known that I, GEORGES HEBERLEIN, a citizen of the Swiss Republic, and a resident of Wattwil, Canton of St. Gall, Switzerland, have invented certain new and useful Improvements in Processes for Production of Permanent Effects in Cotton Fabrics (which improvements are described in the following filed applications, i. e., German application Ser. No. H. 64,376, filed Nov. 20, 1913, Patent #280,134, granted Nov. 4, 1914; French application Ser. No. 67,013, filed Feb. 19, 1914, Patent #468,642, granted Apr. 29, 1914; British application Ser. No. 13,129 of 1914, filed May 28, 1914, Patent #13,129 of 1914, granted as of Nov. 20, 1913; Italian application Ser. No. (have none), filed June 9, 1914, Patent 143,796, granted Jan. 11, 1915; Belgian application Ser. No. 219,478, filed June 19, 1914, Patent 268,537, granted June 30, 1914; Austrian application Ser. No. (have none), filed May 29, 1914; Patent 70,004, granted June 21, 1915; German application Ser. No. H. 64,558, filed Dec. 5, 1913, Patent 290,444, granted Feb. 28, 1916; French application Ser. No. 67,157, filed Febr. 23, 1914, Patent 468,821, granted May 4, 1914; Italian application Ser. No. (have none), filed May 20, 1914, Patent 143,193, granted July 11, 1914; Belgian application Ser. No. 219,476, filed Jan. 19, 1914, Patent 268,535, granted June 30, 1914; British application Ser. No. 12,559 of 1914, filed May 21, 1914, Patent 12,559 of 1914, granted as of Dec. 5, 1913; Austrian application Ser. No. (have none), filed May 22, 1914, Patent 69,358, granted Mar. 27, 1915; German application Ser. No. H. 67,112, filed July 17, 1914, Patent of addition 294,571, granted Oct. 10, 1916; German application Ser. No. H. 65,355, filed Febr. 13, 1914, Patent of addition 292,213, granted May 26, 1916; German application Ser. No. H. 68,470, filed May 19, 1915, Patent 295,816, granted Dec. 18, 1916; French application Ser. No. 83,050, filed Apr. 21, 1916, Patent 481,561, granted Sept. 23, 1916; British application Ser. No. 6,218 of 1916, filed May 1, 1916, Patent No. 100,483, granted as of May 19, 1915; Belgian application Ser. No. 225,208, filed June 24, 1919, Patent 280,937, granted (not yet issued); Italian application Ser. No. (have none), filed May 4, 1916, Patent 154,095, granted June 5, 1916; Austrian application Ser. No. (have none), filed Apr. 29, 1916, Patent 81,367, granted Sept. 25, 1920), of which the following is a specification.

My invention relates to the production of permanent effects in cotton fabrics which are effected by chemical structural changes in the fibres.

The object of the invention is to produce a structural change in the cotton fibres that will result in a more valuable fabric such for example as a fabric of more pleasing appearance or effect, and one that is permanent, i. e., that will withstand repeated laundering and according to the preferred method, that will give to the fabric a wool-like quality or effect.

In my United States Patent No. 1,141,872, granted June 1, 1915, I have described and claimed a process of treating cotton fabric to produce permanent wool-like effects, by first mercerizing the fabric and then treating it with concentrated sulphuric acid of less than 51° Bé. It was described in that patent specification that if cotton fabric which has been mercerized and also preferably bleached, be subjected to the action of sulphuric acid of from 49° to somewhat under 51° Bé. (the best action being obtained between 49½ deg. and 50½ deg. Bé.), the mercerizing lustre disappears, and instead of the transparency obtained with the higher concentration of sulphuric acid, the fabric assumes a fine light-crape-like nature, whereby it appears fuller, more wool-like, softer, and is generally improved and it has imparted to it somewhat the character of fine woolen stuff, such for example as fine thin wool muslin. When the cotton fabric is subjected to both the mercerizing treatment and the treatment with sulfuric acid of 51° Baumé or over, there is obtained the transparent fabric that is the subject of my United States Letters Patent No. 1,392,265, granted September 27, 1921, and when the fabric is subjected to the mercerizing treatment and to a treatment with sulfuric acid of somewhat under 51° Baumé, there is obtained the wool-like fabric that is the subject of my United States Letters Patent No. 1,392,264, granted September 27, 1921.

It was also pointed out in that patent that the treatment could be utilized in the method described for producing pattern effects. It was pointed out that pattern effects could be produced on plain fabrics by printing on mercerized fabrics with sulphuric acid of say 50° Bé. and washing out after action has taken place; or that a suitable resist such as gum thickening could be impressed on portions of the fabric in such a way as to protect the parts not to be acted upon by the acid, and then the entire fabric dipped into sulphuric acid of the aforesaid concentration, and subsequently washing the fabric.

I have also discovered that the wool-like quality of the fabric mentioned in said Patent No. 1,141,872 is also obtained if the cotton fabric is first treated with the sulphuric acid of from 49° to 51° Bé., then washed, and without stretching, mercerizing the fabric with caustic alkali such as caustic soda. The latter process forms the subject matter of my co-pending application Serial Number 497,738 filed on even date herewith.

The latter process is distinguished from that described in the aforesaid patent, in that the said wool effect is obtained according to the process of the aforesaid patent, regardless of whether the mercerizing is carried out with or without stretching, whereas in said latter process where the mercerizing is carried out after the acid treatment, the proper wool-like effect takes place only when the mercerizing is done without stretching.

I have further discovered that the said wool-like effect is attained if in carrying out the above described processes, the treatment with sulphuric acid is replaced by a treatment with phosphoric acid of 55° to 57° Bé., or with hydrochloric acid of the specific gravity of 1.19 at low temperature (as for example below 0° C.) or with nitric acid of 43° to 46° Bé., or with zinc chloride solution of 66° Bé., at 60° to 70° C. or with Schweizer's solution, with a short reaction period. The novel process subject matter herein described but not herein claimed, forms the subject matter of one or another of my copending applications Serial Numbers 497,737, filed September 1, 1921; 497,-738, filed Sept. 1, 1921; 497,740, filed Sept. 1, 1921; 497,741, filed Sept. 1, 1921; 497,742, filed Sept. 1, 1921; 497,743, filed Sept. 1, 1921; 570,497 filed June 23, 1922.

It will be understood by those skilled in the art that when the cotton fibres are treated as herein stated, the fibres are chemically structurally changed by each treatment, and it is a characteristic of fabrics treated according to my process, that the fibres are chemically structurally changed, and that the changed or altered condition of the fibres is permanent, i. e., will withstand repeated laundering so that the goods may be laundered without eliminating or materially altering the characteristics of the fabric above described, and this greatly enhances their value.

Having thus described my invention, what I claim as new and desire to secure by Letters Patent, is:

1. Method of treating cotton fabric to produce a fabric in which the fibres have been chemically structurally altered to give to the fabric a different and pleasing appearance which is permanent, which method comprises subjecting the fabric to two chemical treatments, one a treatment with caustic alkali which will chemically structurally change the fibres, and the other a treatment with a concentrated strong mineral acid which will differently chemically structurally change the fibers without seriously impairing the strength or flexibility of the fabric to produce, in conjunction with said other treatment, said different appearance, the fabric being subjected to one of said treatments after the other, and after the treatment with the said acid washing the fabric.

2. Method of treating cotton fabric to chemically structurally change the fabric so as to produce a wool-like effect, which method comprises subjecting the fabric to two chemical treatments, one a treatment with caustic alkali which will chemically structurally change the fibers, and the other a treatment with a concentrated strong mineral acid which will differently chemically structurally change the fibers without seriously impairing the strength or flexibility of the fabric, to produce in conjunction with said other treatment, said wool-like effect.

3. Method of treating cotton fabric to chemically structurally change the fabric so as to produce a wool-like effect, which method comprises subjecting the fabric to a mercerizing treatment, and thereafter subjecting it to a treatment with a concentrated strong mineral acid which will so alter the fibres of the fabric that the said wool-like quality will be effected.

4. Method of treating cotton fabric to chemically structurally change the fabric so as to produce a wool-like effect, which comprises subjecting the fabric to treatment with a suitable concentrated strong mineral acid which will so chemically structurally change the fibers of the fabric, without seriously impairing the strength or flexibility of the fabric, as to produce said wool-like effect, and then washing the fabric.

5. A step in the method of treating cotton fabric to chemically structurally change the fabric so as to produce a wool-like effect, which step consists in subjecting the fabric to a treatment with a suitable concentrated mineral acid which will chemically structurally change the fibers of the fabric without seriously impairing the strength or flexibility of the fabric, so that said wool-like effect may be produced.

6. Method of treating cotton fabric to chemically structurally change the fabric so as to produce the described wool-like effect, which method comprises subjecting the fabric to two chemical treatments, one a treatment with caustic alkali which will chemically structurally change the fibres, and the other a treatment with concentrated, phosphoric acid, the fabric being subjected to one of said treatments after the other.

7. Method of treating cotton fabric to chemically structurally change the fabric so as to produce the described wool-like effect, which method comprises subjecting the fabric first to a mercerizing treatment and thereafter to a treatment with phosphoric acid of about 55° to 57° Bé.

8. Method of treating cotton fabric to chemically structurally change the fabric so as to produce the described wool-like effect, which method comprises subjecting the fabric to two chemical treatments, one a mercerizing treatment and the other a treatment with phosphoric acid of about 55° to 57° Bé., and then washing the fabric.

9. Method of treating cotton fabric to chemically structurally change the fabric so as to produce the described wool-like effect, which method comprises subjecting the fabric first to a mercerizing treatment with caustic soda, and thereafter subjecting it to a treatment with phosphoric acid of about 55° to 57° Bé., and then washing the fabric.

10. Method of treating cotton fibers to produce a fabric the fibers of which have been chemically structurally altered from ordinary cotton fibers into fibers which give to the fabric a permanent wool-like effect, which method comprises subjecting the fibers to two chemical treatments, one a treatment with caustic alkali which will chemically structurally change the fibers, and the other a treatment with a concentrated mineral acid which will differently chemically structurally change the fibers without seriously impairing the strength or flexibility of the fibers to produce, in conjunction with said other treatment, said wool-like effect, the fibers being subjected to one of said treatments after the other.

In testimony whereof I have signed my name to this specification.

GEORGES HEBERLEIN.